United States Patent [19]

Steinebrunner et al.

[11] Patent Number: 4,850,213
[45] Date of Patent: Jul. 25, 1989

[54] FILLING LEVEL MEASURING DEVICE FOR MEASURING THE FILLING LEVEL OF EXPLOSIVE OR AGGRESSIVE MEDIA IN A CONTAINER

[75] Inventors: Edwin Steinebrunner, Todtnau; Peter Renk, Lörrach, both of Fed. Rep. of Germany

[73] Assignee: Endress u. Hauser GmbH u. Co., Fed. Rep. of Germany

[21] Appl. No.: 90,950

[22] Filed: Aug. 28, 1987

[30] Foreign Application Priority Data

Sep. 29, 1986 [DE] Fed. Rep. of Germany ....... 3633047

[51] Int. Cl.⁴ .......................... B65B 1/30; G01F 23/28
[52] U.S. Cl. ...................................... 73/290 V; 141/95
[58] Field of Search ................ 73/290 V; 141/95, 70; 137/392; 331/338; 340/621

[56] References Cited

U.S. PATENT DOCUMENTS

| 3,625,058 | 12/1971 | Endress et al. |
| 4,198,374 | 4/1980 | Arnaud et al. ................ 364/473 X |
| 4,264,788 | 4/1981 | Keidel et al. |
| 4,437,497 | 3/1984 | Enander ............................ 141/70 |
| 4,507,583 | 3/1985 | Jensen et al. .................. 340/621 |
| 4,551,719 | 11/1985 | Carlin et al. .................. 364/465 X |
| 4,703,652 | 11/1987 | Itoh et al. .................... 340/621 X |
| 4,730,650 | 3/1988 | Ziegler et al. ................ 141/95 |

FOREIGN PATENT DOCUMENTS

| 582760 | 10/1928 | Fed. Rep. of Germany . |
| 2547759 | 4/1977 | Fed. Rep. of Germany . |
| 8332045 | 4/1984 | Fed. Rep. of Germany . |
| 491370 | 3/1969 | Switzerland . |
| 2054853 | 2/1981 | United Kingdom . |
| 2108667 | 5/1983 | United Kingdom . |
| 2185575 | 7/1987 | United Kingdom . |

Primary Examiner—Daniel M. Yasich
Attorney, Agent, or Firm—Barnes & Thornburg

[57] ABSTRACT

A filling level measuring device for measuring the filling level of explosive media in a container is provided. The device includes a sonic or ultrasonic transducer and a mounting flange for mounting the filling level measuring device on the container. The separation necessary between the explosive media within the container and the electrical operating means of the filling level measuring device is effected by a planar homogeneous metallic surface of the mounting flange which faces the container interior and which includes a diaphragm of the sonic or ultrasonic transducer. To form the diaphragm in the mounting flange on its side remote from the container interior, the mounting flange is formed to include a cylindrical recess whose axis of symmetry coincides with that of the mounting flange. The sonic or ultrasonic transducer is disposed substantially within the recess formed in the mounting flange. In addition, structural sound decoupling is provided between the sonic or ultrasonic transducer and the mounting flange, as well as an arrangement for mechanical protection of the diaphragm.

12 Claims, 2 Drawing Sheets

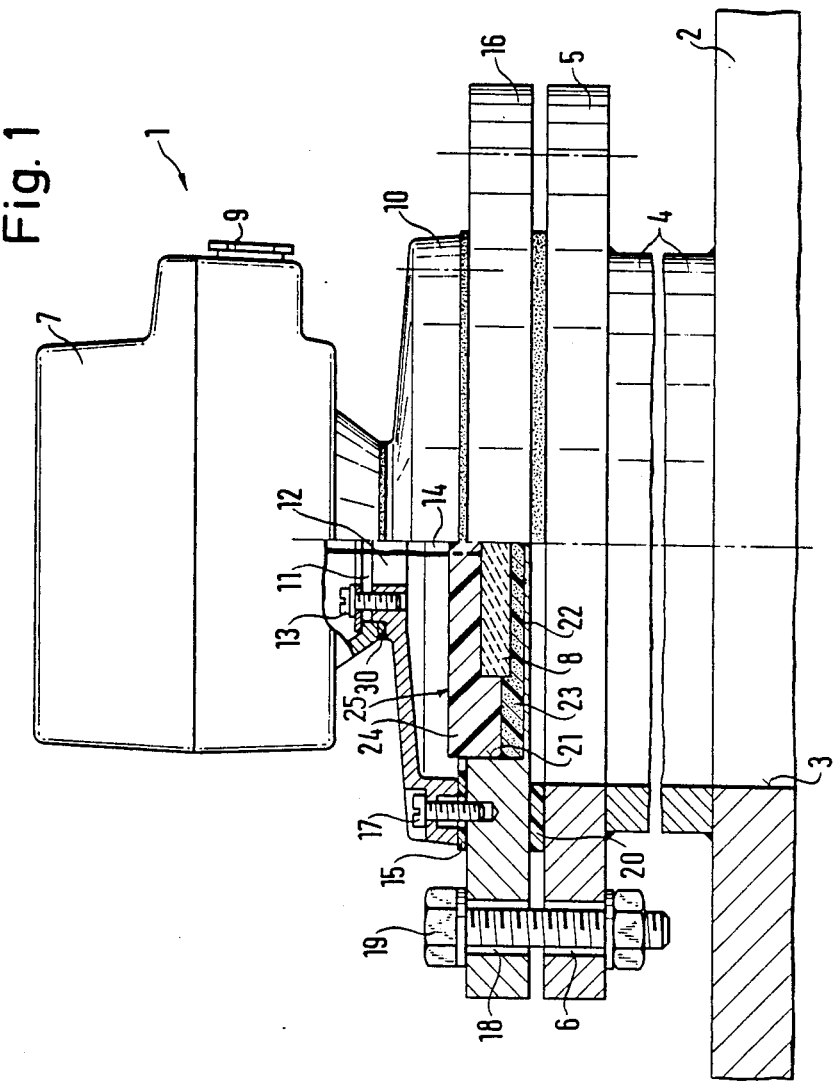

FILLING LEVEL MEASURING DEVICE FOR MEASURING THE FILLING LEVEL OF EXPLOSIVE OR AGGRESSIVE MEDIA IN A CONTAINER

The invention relates to a sonic or ultrasonic transducer of a filling level measuring device for measuring the filling level in a container having an explosion-endangered inner zone, the sonic or ultrasonic transducer having a metal diaphragm in contact with a piezoelectric element and being connected by means of a metal flange via an opening of the container to the latter.

For measuring the filling level with electrically operated filling level meters, for example sonic or ultrasonic filling level measuring devices, in containers with explosion-endangered inner zone, steps must be taken to separate the electrical operating means of the level measuring device in a manner proof against flame flashover from the inner zone of the container. This separation is also necessary with respect to the atmosphere for the opening of the container via which the level measuring device is necessarily mounted on the container in such a manner that it is in spatial contact with the explosion-endangered inner zone.

According to German utility model No. G 83 32 045.8 the ultrasonic sensor of a level measuring device is proposed which is suitable for use in a container having an inner zone in which there is a danger of explosion due to combustible dusts. This problem is solved in the known sensor by a metal housing which surrounds the sensor pot in dust-tight manner and a line arrangement which runs in the interior of the housing pot and is electrically connected to the metal diaphragm for the purpose of potential equalization.

Another solution of the same problem is known with another ultrasonic sensor which is commercially available. In this case the ultrasonic sensor is provided with an annular cylindrical shank which passes through a central bore of the mounting flange and is surrounded coaxially by a bush. The bush is arranged between the shank and flange in such a manner that between the cylindrical surface of the bush and the inner wall of the central bore of the mounting flange an annular cylindrical air gap is formed which is so dimensioned that it represents a separation resistant to flame flashover between the explosive and non-explosive regions. The actual ultrasonic transducer, disposed beneath the annular cylindrical shank and surrounded by a metal housing, then projects into the inner zone of the container.

Both the hitherto known solutions have the disadvantages that they are complicated and in addition require many parts made from different materials which are all in contact with the medium and which therefore considerably reduce the safety and life of the measuring device, in particular with aggressive media; also, in the solutions known hitherto considerable expenditure is needed for the mounting and disassembling of the measuring device.

The problem underlying the invention is to provide a filling level measuring device which can be made with low expenditure, easily assembled and disassembled, and ensures an absolute separation of the electrical operating means and the atmosphere from the explosion-endangered inner zone of the container and is therefore necessary for use in containers with explosion-endangered inner zone.

This problem is solved by the features set forth in the claims.

In addition, the level measuring device according to the invention has the advantage that a homogeneous metal surface continuous throughout and made from only one workpiece is present which (apart from the material of the flange seal) is the only piece coming into contact with the measured medium and consequently the sensor is suitable for use in aggressive media or foodstuffs.

A further advantage lies in the low overall height of the sensor. Every sonic or ultrasonic sensor stimulated in pulse manner has at the end of the transmission pulse a so-called dead time in which no measurements are possible. Dead time is the term applied to the interval of time which the sensor requires for its oscillations to decay after termination of the transmission pulse. For as long as the diaphragm acting as transmitter and receiver continues to oscillate after termination of the transmission pulse no echo pulse can be received. Although a number of measures have been proposed for shortening the decay time of the sensor or for receiving echo signals even during this time, nevertheless a period of time remains directly after termination of the transmission pulse which is not available for receiving the echo pulse. However, the maximum filling level of the material in the container which can be measured depends on the travel time of the transmission pulse in the medium air. Measurements above this limit are then not possible because the travel time of the transmission pulse to the material surface and back to the sensor is so short that the reception occurs in the decaying phase of the sensor vibrations after termination of the transmission pulse. Attempts have been made to counteract this disadvantage by arranging the ultrasonic sensor in the cover of the container as far as possible in such a manner that with corresponding travel time of the transmission pulse maximum utilization of the container interior is possible.

It is therefore proposed according to DE-PS No. 2,547,759 to arrange on the cover of a container a tubular extension which permits the sensor to be mounted at a predetermined distance above the container cover. To avoid interfering reflections the sonic pulse is conducted by means of a sonic guide tube.

Since in the subject of the invention the sonic or ultrasonic transducer does not project into the inner zone of the container but instead the transducer diaphragm and mounting flange lie in a plane, a higher filling of the container and thus better utilization of its storage capacity is possible.

One advantageous further development of the invention is characterized in the subsidiary claims.

Further features and advantages will be explained with reference to an example of embodiment of the invention with the aid of the drawings, wherein:

FIG. 1 is a schematic illustration of a first embodiment of the invention;

Figure 3:
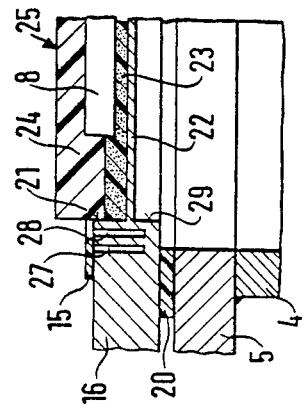
FIG. 3 is a further example of the device according to the invention, additional measures being shown in FIGS. 2 and 3 for decoupling structural sound.

In FIG. 1, 1 denotes a filling level measuring device which for the sake of explanation is assumed to be an ultrasonic level meter. The invention is however not restricted to the use of ultrasonic waves but can also be used for filling level measuring devices operating with sonic pulses. The level measuring device 1 is disposed above the cover 2 of a container whose filling level is to be measured. For this purpose the cover 2 has a cylindrical opening 3 formed by a short tube piece 4. A flange 5 is connected to the tube piece. The flange 5 comprises a number of bores 6 which are uniformly distributed over the periphery of a circle of holes.

The level measuring device 1 comprises a housing 7 in the interior of which arranged on a circuit board are the electrical and electronic components which generate the electrical pulse for stimulating the piezoelectric element 8. Another function of these components is to receive the electrical echo pulse generated by the piezoelectric element 8, amplify it and transmit it via an electrical connecting line, not shown, to the evaluation device arranged separate from the level measuring device 1. The electrical power required for the operation is obtained by the level measuring device 1 from the evaluation device likewise via the electrical connection line, not shown. The introduction of this line into the housing 1 is through the cable ferrule connection 9.

Disposed beneath the housing 7 is the transducer housing 10. The housing 7 and transducer housing 10 are aligned with each other in such a manner that cylindrical openings 11, 12 are in alignment. The securing of the housing 7 to the transducer housing 10 is with interposition of a seal 30 by means of screws 13.

Through the cylindrical openings 11, 12 electrical cables 14 are led which connect electronic components, not illustrated, in the interior of the housing 7 to the piezoelectric element 8.

The transducer housing 10 is connected to the flange 16 with interposition of the annular seal 15. The securing elements are the screws 17. By the flange 16 the filling level measuring device 1 is connected to the flange 5 of the cover 2. For this purpose the flange 16 has a series of bores 18 which are uniformly distributed along a circle of holes in alignment with the bores 6 of the flange 5. The detachable connection between the flanges 5, 16 is by means of a screw connection 19 with interposition of a resilient annular seal 20.

The mounting flange 16 comprises on its side remote from the container inner zone a cylindrical recess 21; the latter is arranged such that its axis of symmetry coincides with the axis of symmetry of the flange 16. The cylindrical recess 21 traverses the flange 16 but does not pass completely through the latter, being sealed on the side facing the container inner zone by an approximately 1.5 mm thick region 22.

The cylindrical recess 21 of the mounting flange 16 now serves simultaneously to receive the piezoelectric element 8 and the matching layer 23 consisting of a suitable silicone elastomer and the damping layer 24 likewise consisting of a suitable silicone elastomer. The region 22 of the flange 16 represents the diaphragm of the ultrasonic transducer 25. The recess 21 can be made by any cutting method known to the expert. However, it must be made such that the diaphragm 22 has a uniform thickness of high precision.

Apart from being a connecting element between the mounting flange 16 and the housing 7, the function of the transducer housing 10 is to cover the ultrasonic transducer 25 consisting of piezoelectric element 8, matching layer 23 and damping layer 24 in protective manner from the environment.

Now, the integration of the ultrasonic transducer 25 into the mounting flange 16 gives an extremely flat design of the level measuring device 1. The side of the flange 16 facing the interior of the container forms a homogeneous continuous metal surface enclosing the diaphragm of the ultrasonic transducer 25 and no component of the level measuring device 1 projects beyond the mounting flange into the interior of the container.

If the diaphragm thickness is chosen to comply with the prescribed strength characteristics when using electrical devices in explosive areas the the continuous metallic surface of corresponding strength gives a separation absolutely proof against flame flashover of the explosion-endangered inner zone of the container from the electrical operating components of the filling level measuring device 1 and with the effect of the sealing ring 20 from the atmosphere so that the filling level measuring device according to the invention is suitable for use in explosion-endangered inner regions of a container.

If a stainless acid-resistant steel is chosen for the flange 16 and apart from the material of the annular seal 20 is then the only material coming into contact with the measured medium, the level measuring device 1 can also be used in aggressive media and in the foodstuffs industry.

Figure 2:
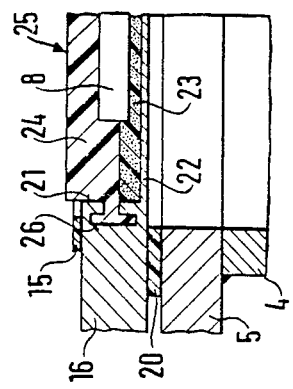
FIG. 2 is another example of an embodiment of the invention.

In FIGS. 2 and 3 two other examples of embodiment of the invention are shown (fragments). Both embodiments show for example possible steps to provide an additional structural sound decoupling of the ultrasonic transducer 25. In FIGS. 2 and 3 the same reference numerals as in FIG. 1 are used in so far as they are employed to explain the example of embodiment. FIG. 2 again shows the mounting flange 16 in the cylindrical recess 21 of which the ultrasonic transducer 25 is disposed. The flange 16 is detachably connected to the flange 5. The diaphragm 22 also faces the interior of the container. In contrast to the embodiment of FIG. 1 the surface of the recess 21 comprises a radially extending groove 26 whose cross-section has the form of a T arranged on its side. It is formed by two annular grooves connected together, of which that facing the cylindrical recess 21 has a square cross-section whilst the second groove remote from the cylindrical recess 21 has the form of an axially extending rectangle. This groove interrupts the surface of the cylindrical recess 21 so that a substantial structural sound decoupling of the ultrasonic transducer 25 with respect to the flange 16 is obtained.

A further example of embodiment is shown in FIG. 3. In this case instead of the T-shaped groove 26 another step for decoupling structural sound of the ultrasonic transducer 25 is shown. For this purpose the flange 16 is provided with flutes or grooves 27, 28 extending in axial direction from the side remote from the interior of the container. They do not of course pass through the flange completely, their depth being chosen so that the strength of the flange is not impaired or only impaired to a negligible extent. The grooves 27, 28 run in a circular path with equal spacing from the cylindrical recess 21 so that the axis of symmetry of the peripheral circle of the groove 27, 28 coincides with the axis of symmetry of the cylindrical recess 21.

Of course, the steps for structural sound decoupling are not restricted to these two examples of embodiment shown; the expert can adopt any other method for additional decoupling of structural sound. Thus, the means for decoupling structural sound can also be filled with a sound-absorbent material.

FIG. 3 also shows another improved embodiment of the invention of FIG. 1. Accordingly, the circular recess 21 penetrates the flange 16 only up to about half the depth shown in FIG. 1. The arrangement of the ultrasonic transducer 25 is thus corresponding to FIG. 1 with however the difference that the damping layer 24 made from a suitable silicone elastomer projects somewhat further out of the flange 16. A cylindrical recess 29 is now also formed on the side facing the container inner zone. The region 22 remaining between the recesses 21 and 29 also forms according to the invention the diaphragm of the ultrasonic transducer 25. The advantage of the further development of FIG. 3 is that the cylindrical recess 29 forms a depression which is set back from the homogeneous surface of the flange 16 and which protects the diaphragm from external mechanical damage. The depth of the recess 29 may be made corresponding to the need for protection and/or corresponding to the necessary installation depth of the ultrasonic transducer 25.

We claim:

1. A device for measuring the filling level of a material in a container, the interior of which is explosive endangered, the device comprising a flange for mounting said device on a wall of said container and for isolating the device from the interior of the container, with the flange forming a cover mounted on an opening in said container wall, a first cylindrical recess formed in said flange on the side remote from the interior of said container and extending through a part of the thickness of said flange with the remainder of the flange thickness forming a thin bottom wall of said first recess, and an acoustic transducer disposed in said first recess so that the thin bottom wall of said first recess forms a diaphragm of said acoustic transducer, said acoustic transducer serving for transmitting sonic or ultrasonic pulses towards the surface of the material in the container and for receiving echo pulses reflected at said surface.

2. A device as claimed in claim 1 in which said diaphragm has a constant thickness of about 1.5 mm.

3. A device as claimed in claim 1 in which the side of said flange facing the interior of the container is a homogeneous planar surface including said diaphragm.

4. A device as claimed in claim 1 in which a second cylindrical recess is formed in said flange in axial alignment with said first cylindrical recess on the side of said flange facing the interior of the container, said second recess extending through a part of the thickness of said flange with the remainder of the flange thickness forming a thin separating wall between the two recesses which forms the diaphragm of said acoustic transducer.

5. A device as claimed in claim 1, further comprising sound decoupling means formed in flange for reducing the transmission of sound waves from said acoustic transducer through said flange.

6. A device as claimed in claim 5 in which said sound decoupling means comprises a radially extending circumferential groove formed in the flange portion surrounding said first recess.

7. A device as claimed in claim 6 in which said circumferential groove has a substantially T-shaped cross-section with a first portion of substantially square cross-section which extends radially from the peripheral wall of said first recess and an axially extending portion of substantially rectangular cross-section adjoining said first portion.

8. A device as claimed in claim 6 in which said circumferential groove is filled with a sound-absorbent material.

9. A device as claimed in claim 5 in which said sound decoupling means comprises at least one axially extending circumferential groove formed in the flange portion surrounding said first recess coaxially with said first recess.

10. A device as claimed in claim 9 in which said circumferential groove is filled with a sound-absorbent material.

11. A device as claimed in claim 1 in which said acoustic transducer comprises a piezoelectric element, an acoustic impedance matching layer disposed between said piezoelectric element and said diaphragm, and a damping layer covering the opposite side of said piezoelectric element which is remote from said diaphragm.

12. A device as claimed in claim 1, further comprising a transducer housing that is attached to said flange so as to enclose said first recess and the acoustic transducer disposed therein.

* * * * *